Feb. 18, 1964  R. F. GILLESPIE  3,121,419
PET FEEDER AND WATERER

Filed Aug. 17, 1962  2 Sheets-Sheet 1

INVENTOR.
RUSSELL F. GILLESPIE,
BY
McMorrow, Berman + Davidson
ATTORNEYS.

Feb. 18, 1964   R. F. GILLESPIE   3,121,419
PET FEEDER AND WATERER
Filed Aug. 17, 1962   2 Sheets-Sheet 2
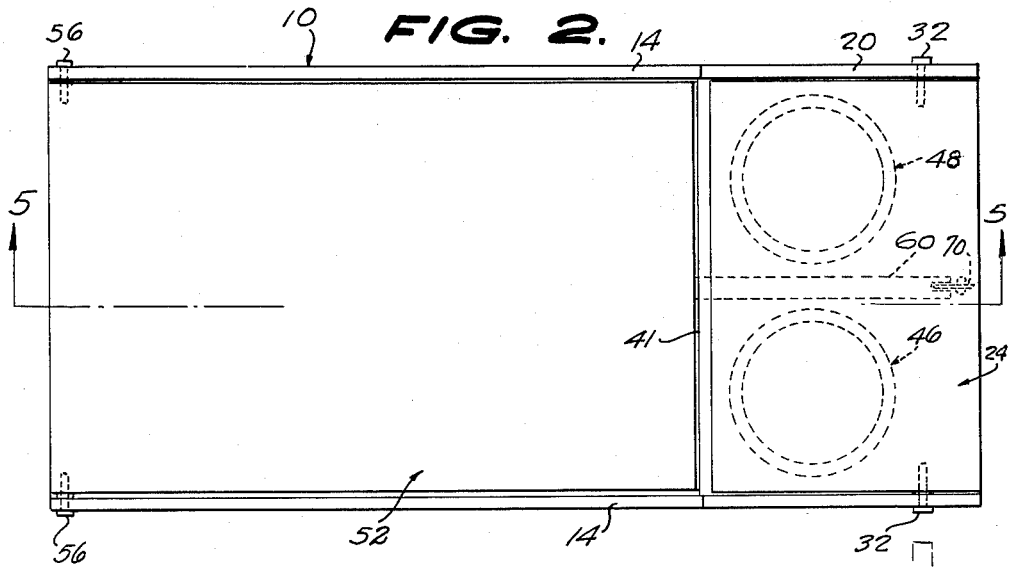
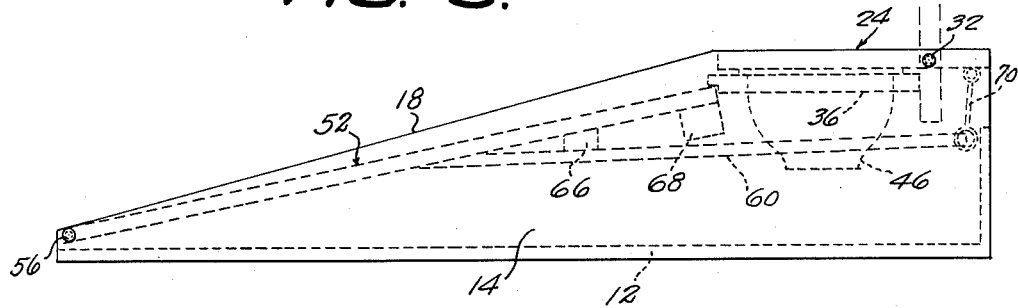
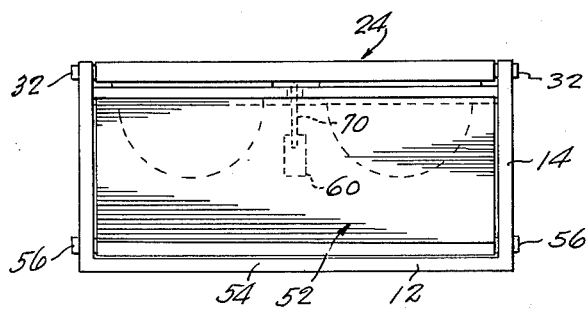
INVENTOR.
RUSSELL F. GILLESPIE,
BY
McMorrow, Berman + Davidson
ATTORNEYS.

United States Patent Office 3,121,419
Patented Feb. 18, 1964

1

3,121,419
PET FEEDER AND WATERER
Russell F. Gillespie, 4603 E. Compton Blvd.,
Compton, Calif.
Filed Aug. 17, 1962, Ser. No. 217,611
4 Claims. (Cl. 119—62)

This invention relates to a novel pet feeder and waterer of the type having food and water containing means normally protected by a cover which is adapted to be moved to open position by the weight of a pet on a treadle.

The primary object of the invention is the provision of a more sanitary, efficient and practical device of the kind indicated wherein food and water is positively shielded against the intrusion of dust, dirt, rain, insects, and small rodents, and the food and water kept fresher and cleaner and their evaporation retarded, and injuries to pets or children are eliminated.

Another object of the invention is the provision of a rugged, long-life mechanically superior, and simpler device of the character indicated above, which is composed of a minimum number of uncomplex and easily assembled parts, which can be made inexpensively from a variety of easily cleaned materials, such as metal, plastics, and finished wood.

Other important objects and advantageous features of the invention will be apparent from the following description and the accompanying drawings, wherein for purposes of illustration only, a specific form of the invention is set forth in detail.

In the drawings:

FIGURE 2 is an enlarged top plan view of said device, with the cover closed;

FIGURE 3 is a side elevation of FIGURE 2;

FIGURE 4 is a left hand or front end elevation of FIGURE 2;

Figure 1:
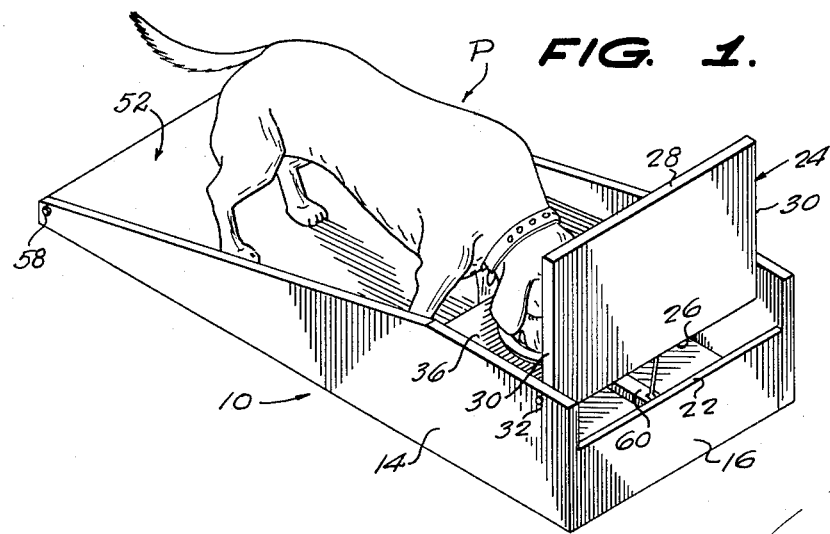
FIGURE 1 is a perspective view of a device of the present invention showing the cover thereof opened by a pet standing on its treadle.

Referring in detail to the drawings, the illustrated device comprises a longitudinally elongated rectangular housing 10, having a flat bottom wall 12, upstanding side walls 14, and an upstanding rear end wall 16 which extends between the bottom wall and the side walls. The housing 10 is devoid of a front end wall. The side walls 14 are tapered in height toward the forward end of the housing, as indicated at 18, and have horizontal upper edge portions 20 adjacent to and extending to the rear end of the housing, the edge portions 20 being parallel to and substantially spaced above the bottom wall 12. The housing 10 can be a simple piece of molded material, such as plastic.

Figure 5:
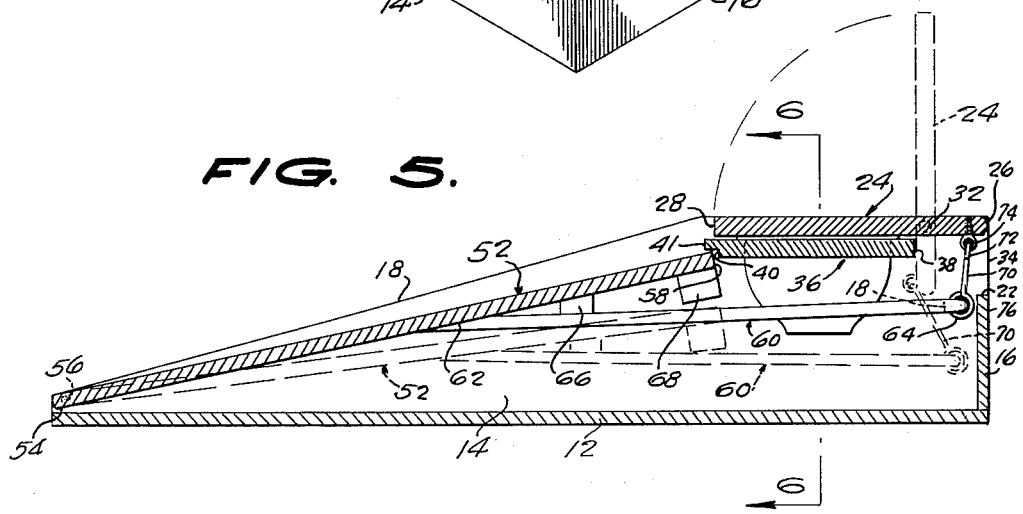
FIGURE 5 is a vertical longitudinal section taken on the line 5—5 of FIGURE 2, showing the cover in closed position in full lines, and in open position, in phantom lines.
Figure 6:
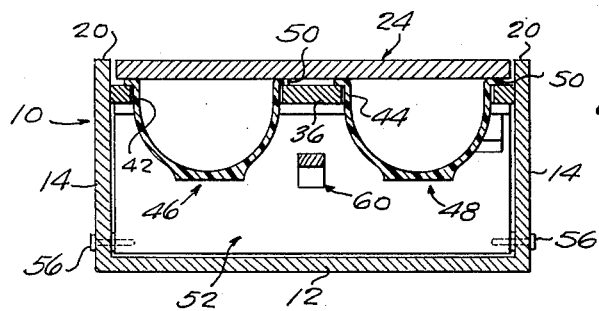
FIGURE 6 is a transverse vertical section taken on the line 6—6 of FIGURE 5.

The upper edge 22 of the rear end wall 16 is spaced downwardly from the upper edge portons 20 of the side walls 14, in order to provide clearance for the adjacent edge of a flat rectangular, transversely elongated cover 24 positioned between the side walls 14, having straight rear and forward side edges 26 and 28, respectively, and straight end edges 30 which run close to the inner surfaces of the housing side walls 14. The width of the cover 24 substantially corresponds to the length of the side wall edge portions 20, and in its closed horizontal position, as shown in FIGURE 5, the cover is coextensive with and flush with the side wall edge portions 20.

The cover 24 is pivoted, as indicated at 32, to the housing side walls 14, on a transverse axis which is located adjacent to the rear side edge 26 of the cover and similarly adjacent to the rear edges 34 of the side walls, on a level below the side wall edge portions 20, so that the cover, in its closed position, is flush with the side wall edge portions 20.

A horizontal transversely elongated shelf 36, narrower than the cover 24, extends between and is fixed to the housing side walls 14, on a level adjacent to and below the side wall edge portions 20, and has a forward edge 38 spaced forwardly from the cover pivot means 32, and a rear edge 40 which terminates substantially at the rear side edge 26 of the cover 24. Extending along the forward edge 38 of the shelf 36 is a stop flange 41 which is spaced upwardly from the underside of the shelf.

The shelf is formed with a pair of openings 42 and 44 which are spaced from each other and from the housing side walls 14, in which food and water receptacles 46 and 48, respectively, are adapted to be selectively engaged, the receptacles having lateral heads 50 around their upper edges, which supportably bear upon the upper surface of the shelf 36, at such a distance above the housing bottom wall 12, that the cover 24 bears upon the beads 50, in its closed position, and seals the contents of the receptacles, against intrusion of extraneous matter, and keeps their contents fresh and retards evaporation and spoiling thereof. The receptacles are preferably of molded plastic and are easily removable from the shelf for cleansing and sterilizing.

The cover 24 which is normally gravitationally overbalanced forwardly to its closed position, is adapted to be opened to an erect perpendicular position, as indicated in FIGURES 1 and 5, when a pet P walks onto and stands upon a treadle 52, which is in the form of a longitudinally elongated flat plate, which reaches between the side walls 14 of the housing 10, and extends from the forward end 54 of the housing bottom wall 12, to the forward edge of the cover 24. The treadle 52 is pivoted, as indicated at 56, at its forward end, to the side walls 14, on a transverse axis located adjacent to the rear end of and slightly above the upper surface of the bottom wall 12. The rear end edge 58 of the treadle 52 is positioned beneath and is adapted to engage the underside of the stop flange 41 on the forward side edge of the cover 24, as shown in FIGURE 5, in the normal, elevated position of the treadle.

A centered longitudinally elongated lever bar 60 is suitably fixed, at its rear end, as indicated at 62, to an intermediate part of the underside of the treadle 52, and extends forwardly beyond the rear end edge of the treadle, and between the receptacles, beneath the shelf, and has a terminal rear end 64 which is closely spaced from the forward side of the rear end wall 16 of the housing 10. The lever bar 60 is disposed at an acute downward angle to the treadle 52, and, in the elevated position of the treadle, is substantially parallel with the housing bottom wall 12 and spaced at a substantial distance thereabove.

Counterweights 66 and 68 can be secured to the underside of the treadle 52, at one side of the bar, and spaced therealong, for steadying the action of the treadle.

The lever bar 60 is operatively connected to the cover 24, at a centered location adjacent to the rear side edge of the cover, by means of a normally vertical link 70 which, at related ends, is freely pivoted to the forward end of the lever bar and the cover, as by means of an eye 72, on the upper end of the link, engaged through a pendant eye 74 on the cover, and an eye 76, on the lower end of the link, engaged through an opening 78 in the lever bar. The over-center counterbalancing weight of the cover 24 is sufficient to close it. As shown in FIGURE 5, in its open position, the cover 24 leans slightly forwardly from the perpendicular, so that the cover constantly tends to overbalance toward its closed position. The operative arrangements hereinabove described complete the elevation of the treadle 52 from depressed position to its normal elevated position, as the weight of a pet is removed from the treadle and the lever bar 60 has resiled from its downwardly flexed condition and the treadle is started upwardly thereby.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A pet feeder and waterer comprising a housing having forward and rear ends, a bottom wall, and transversely spaced upstanding side walls, a shelf extending between the side walls at the rear end of the housing and spaced upwardly from the bottom wall, a cover extending between the side walls above the shelf and pivoted to the side walls to swing from a horizontal closed position to a vertical open position, food and water receptacle means supported on the shelf and having upper edges, said cover engaging said upper edges and sealing the receptacle means in its closed position, a treadle pivoted between the side walls above the bottom wall, and means operatively connecting the treadle with the cover, said treadle being located forwardly of the shelf and normally being angled upwardly from its forward end to its rear end toward the shelf with its rear end in stop engagement with the shelf, said connecting means comprising a lever bar fixed at its rear end to the underside of the treadle and extending rearwardly beneath said shelf, the pivotal axis of the cover being located closer to the rear edge of the cover than to its forward edge whereby the cover is forwardly overbalanced, and vertical link means pivoted at its lower end to the lever bar and at its upper end to the cover at a location spaced rearwardly from the pivotal axis of the cover.

2. A pet feeder and waterer comprising a housing having forward and rear ends, a bottom wall, and transversely spaced upstanding side walls, a shelf extending between the side walls at the rear end of the housing and spaced upwardly from the bottom wall, a cover extending between the side walls above the shelf and pivoted to the side walls to swing from a horizontal closed position to a vertical open position, food and water receptacle means supported on the shelf and having upper edges, said cover engaging said upper edges and sealing the receptacle means in its closed position, a treadle pivoted between the side walls above the bottom wall, and means operatively connecting the treadle with the cover, said treadle being located forwardly of the shelf and normally being angled upwardly from its forward end to its rear end toward the shelf with its rear end in stop engagement with the shelf, said connecting means comprising a lever bar fixed at its rear end to the underside of the treadle and extending rearwardly beneath said shelf, the pivotal axis of the cover being located closer to the rear edge of the cover than to its forward edge whereby the cover is forwardly overbalanced, and vertical link means pivoted at its lower end to the lever bar and at its upper end to the cover at a location spaced rearwardly from the pivotal axis of the cover, said link means being proportioned in length to put the cover in a forwardly angled position in the open position of the cover.

3. A pet feeder and waterer comprising a horizontal housing having forward and rear ends, a bottom wall, and side walls, said side walls having horizontal upper edge portions extending to the rear end of the housing, a horizontal shelf spaced above said bottom wall and fixed to the side walls, said shelf extending along and being spaced below said upper edge portions, said shelf having openings containing removable food and water receptacles having upper edges spaced above the shelf, said shelf having a rear edge having a stop flange extending therealong, a normally horizontal cover extending between the side walls along said upper edge portions and resting upon the upper edges of and sealing the receptacles, said cover having a rear edge, said cover being pivoted to the side walls on a transverse axis spaced above the shelf and located adjacent to the rear edge of the cover whereby the cover is forwardly overbalanced in its upwardly pivoted open position, a treadle extending along the housing above its bottom wall and between its side walls, said treadle being pivoted at its forward end to the housing side walls on an axis spaced above the bottom wall, said treadle normally occupying an elevated position at an acute angle to the bottom wall, said treadle having a rear end adapted to bear upwardly against said stop flange, a longitudinal lever bar fixed at its rear end to the underside of the treadle and extending forwardly from the treadle and spacedly beneath the shelf, said lever bar being downwardly angled relative to the treadle, said lever bar having a rear end located adjacent to the pivotal axis of the cover, and means extending between and operatively connected to the cover at a point rearwardly of its pivotal axis and to the rear end of the lever bar.

4. A pet feeder and waterer comprising a horizontal housing having forward and rear ends, a bottom wall, and side walls, said side walls having horizontal upper edge portions extending to the rear end of the housing, a horizontal shelf spaced above said bottom wall and fixed to the side walls, said shelf extending along and being spaced below said upper edge portions, said shelf having openings containing removable food and water receptacles having upper edges spaced above the shelf, said shelf having a rear edge having a stop flange extending therealong, a normally horizontal cover extending between the side walls along said upper edge portions and resting upon the upper edges of and sealing the receptacles, said cover having a rear edge, said cover being pivoted to the side walls on a transverse axis spaced above the shelf and located adjacent to the rear edge of the cover whereby the cover is forwardly overbalanced in its upwardly pivoted open position, a treadle extending along the housing above its bottom wall and between its side walls, said treadle being pivoted at its forward end to the housing side walls on an axis spaced above the bottom wall, said treadle normally occupying an elevated position at an acute angle to the bottom wall, said treadle having a rear end adapted to bear upwardly against said stop flange, a longitudinal lever bar fixed at its rear end to the underside of the treadle and extending forwardly from the treadle and spacedly beneath the shelf, said lever bar being downwardly angled relative to the treadle, said lever bar having a rear end located adjacent to the pivotal axis of the cover, and means extending between and operatively connected to the cover at a point rearwardly of its pivotal axis and to the rear end of the lever bar, said means comprising a vertical link pivoted at its upper end to the cover and pivoted at its lower end to the lever bar.

References Cited in the file of this patent

UNITED STATES PATENTS

| | | |
|---|---|---|
| 490,095 | Baskett | Jan. 17, 1893 |
| 820,316 | Richmond | May 8, 1906 |
| 2,406,432 | Niere | Aug. 27, 1946 |
| 2,845,896 | Copeland | Aug. 5, 1958 |
| 2,946,474 | Knapp | July 26, 1960 |